US010746125B2

(12) United States Patent
Takata et al.

(10) Patent No.: US 10,746,125 B2
(45) Date of Patent: Aug. 18, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Yusuke Takata, Toyota (JP); Masanori Toya, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/386,323

(22) Filed: Apr. 17, 2019

(65) Prior Publication Data

US 2019/0353116 A1 Nov. 21, 2019

(30) Foreign Application Priority Data

May 17, 2018 (JP) ................................ 2018-095429

(51) Int. Cl.
*F02D 41/34* (2006.01)

(52) U.S. Cl.
CPC .................................. *F02D 41/345* (2013.01)

(58) Field of Classification Search
CPC ............... F02D 41/345; F02D 2250/38; F02D 2200/021; F02D 41/047; F02D 41/04
See application file for complete search history.

(56) References Cited

U.S. PATENT DOCUMENTS 6,062,201 A * 5/2000 Nozawa .............. F02D 13/0219 123/478

FOREIGN PATENT DOCUMENTS

| | | | |
|---|---|---|---|
| JP | H07-127514 | A | 5/1995 |
| JP | H11-30142 | A | 2/1999 |
| JP | 2004-084532 | A | 3/2004 |
| JP | 2007-332936 | A | 12/2007 |
| JP | 2017-115579 | A | 6/2017 |
| WO | 2019/049674 | A1 | 3/2019 |

* cited by examiner

*Primary Examiner* — Xiao En Mo
(74) *Attorney, Agent, or Firm* — Oliff PLC

(57) ABSTRACT

A port injection valve injects fuel into an intake passage. An intake synchronous injection is to inject fuel in synchronization with an opening period of an intake valve. A single injection process is to execute only an intake air non-synchronous injection. A majority of a fuel injection period of the single injection process is prior to the opening timing of the intake valve. A controller causes, when switching a fuel injection process from the single injection process to a multiple injection process, an injection start timing of the intake air non-synchronous injection to be more advanced than an injection start timing of the single injection process prior to the switching.

8 Claims, 10 Drawing Sheets

CONTROLLER AND CONTROL METHOD FOR INTERNAL COMBUSTION ENGINE

BACKGROUND

1. Field

The following description relates to a controller and a control method for an internal combustion engine. The internal combustion engine for which the controller and the control method are employed includes a port injection valve that injects fuel into the intake passage.

2. Description of Related Art

Japanese Laid-Open Patent Publication No. 11-30142 describes an example of a controller for setting a fuel injection start timing such that fuel injected from the port injection valve flows into the cylinder within approximately one-third of the opening period of the intake valve since the opening. In the controller, the approximately one-third of the opening period of the intake valve since the opening is short in, for example, a high-speed region. Thus, the controller injects fuel twice in one combustion cycle and performs the second injection after the intake stroke.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A controller for an internal combustion engine is provided.

The controller is employed for the internal combustion engine. The internal combustion engine includes a port injection valve that injects fuel into an intake passage. The controller is configured to execute a fuel injection process for selecting and executing one of two processes, a multiple injection process and a single injection process. The multiple injection process is to sequentially execute an intake air synchronous injection and an intake air non-synchronous injection by operating the port injection valve in order from the intake air non-synchronous injection to the intake air synchronous injection. The intake air synchronous injection is to inject fuel in synchronization with an opening period of an intake valve. The intake air non-synchronous injection is to inject fuel at a timing that is more advanced than a timing of the intake air synchronous injection. The single injection process is to execute only the intake air non-synchronous injection by operating the port injection valve. A majority of a fuel injection period of the single injection process is prior to an opening timing of the intake valve. The controller is also configured to execute an advancement process for setting, when switching the fuel injection process from the single injection process to the multiple injection process, an injection start timing of the intake air non-synchronous injection to be more advanced than an injection start timing of the single injection process prior to the switching.

When the injection amount of the single injection process is large, the amount of fuel collecting in the intake passage is large. This may increase the particle number (PN). Thus, in the above-described configuration, the single injection process and the multiple injection process are employed in combination. The multiple injection process allows the injection amount of the intake air non-synchronous injection to be smaller than the single injection process. Further, the intake synchronous injection allows the amount of fuel collecting in the intake passage to be smaller than the intake air non-synchronous injection. Thus, when the multiple injection process is employed. PN can be reduced even if the amount of fuel injected from the port injection valve in one combustion cycle increases.

As the injection amount of the single injection process is more advanced, the amount of fuel collecting in the intake passage is large. This may prevent atomization. When the intake air non-synchronous injection of the multiple injection process is performed, the injection amount is reduced as compared to the single injection process. This decreases the amount of fuel collecting in the intake passage, thereby limiting the prevention of atomization. Since the prevention of atomization is limited, in order to promote atomization, it is advantageous to lengthen the time interval to the combustion stroke by setting the injection start timing of the intake air non-synchronous injection of the multiple injection process to be more advanced than that of the single injection process. Thus, in the above-described configuration, when the injection process is switched to the multiple injection process, the injection start timing of the intake air non-synchronous injection of the multiple injection process is set to be more advanced than that of the single injection process. Accordingly, in the above-described configuration, the injection start timing is set to be more appropriate for the atomization of fuel injected through the intake air non-synchronous injection than when the injection start timings of the intake air non-synchronous injection are the same in the single injection process and the multiple injection process.

Additionally, the controller of the above-described document intends to atomize fuel by causing the fuel to flow into the combustion chamber at the initial stage of the intake stroke. In general, in order to promote fuel atomization, it is desired that fuel injection be completed if possible to ensure the time for the fuel to be injected before the intake valve opens. Thus, the inventor examined injecting all of the fuel in one fuel injection before the intake valve opens. However, in this case, the inventor found out that when the temperature of the internal combustion engine is low, the amount of fuel collecting in the intake passage might be excessively large depending on the amount of fuel injected from the port injection valve, thereby increasing the number (PN) of particulate matter (PM). The above-described configuration copes with such a problem.

Example 2

In the controller according to example 1, the controller is further configured to execute a synchronization start calculation process for calculating an injection start timing of the intake air synchronous injection in the multiple injection process. The advancement process includes an ensuring timing calculation process for calculating an interval ensuring timing. The interval ensuring timing is an injection start timing of the intake air non-synchronous injection to end the intake air non-synchronous injection at a timing that is advanced from the injection start timing of the intake air synchronous injection by a predetermined interval. The advancement process also includes a determination process for determining the injection start timing of the intake air non-synchronous injection based on an advanced timing of a reference start timing of the intake air non-synchronous injection and the interval ensuring timing.

In the multiple injection process, when the time interval between the end timing of the intake air non-synchronous injection and the start timing of the intake air synchronous injection is excessively short, the controllability of the port injection valve decreases. In fact, the intake non-synchronous injection and the intake synchronous injection overlap with each other. As a result, the injection period may deviate from the intended one. In the above-described configuration, the retardation limit value of the injection start timing of the intake air non-synchronous injection is set to the interval ensuring timing. This restricts situations in which the intake non-synchronous injection and the intake synchronous injection overlap with each other.

Example 3

In the controller according to example 2, the advancement process includes a non-synchronous start timing calculation process, and the non-synchronous start timing calculation process is a process for setting the reference start timing to be more advanced when a rotation speed of a crankshaft of the internal combustion engine is high than when the rotation speed is low.

Even if the crank angles are the same at the injection start timings of the intake air non-synchronous injection, the time interval from the injection start timing to the combustion stroke is shorter when the rotation speed is high than when the rotation speed is low. Thus, the allowance for fuel atomization is small. In the above-described configuration, the reference start timing is set to be more advanced when the rotation speed is high than when the rotation speed is low. This promotes fuel atomization as compared to when the reference start timing is not set to be advanced.

Example 4

In the controller according to example 2 or 3, the advancement process includes a process for advancing a current value of the injection start timing of the intake air non-synchronous injection to the interval ensuring timing in a stepwise manner when the interval ensuring timing is more advanced than a last value of the injection start timing of the intake air non-synchronous injection.

When the injection start timing of the intake non-synchronous injection is changed in a stepwise manner, the amount of fuel collecting in the intake passage suddenly changes. Consequently, the controllability of the air-fuel ratio may decrease. When the time interval between the end timing of the intake non-synchronous injection and the start timing of the intake synchronous injection is too short, the controllability of the air-fuel ratio decreases. In fact, the intake non-synchronous injection and the intake synchronous injection overlap with each other. As a result, the injection period may deviate from the intended one. The above-described configuration takes into account the tendency that decreases in the controllability of the air-fuel ratio when the intake non-synchronous injection and the intake synchronous injection overlap with each other are larger than decreases in the controllability of the air-fuel ratio when the injection start timing is changed in a stepwise manner. That is, in the above configuration, the injection start timing of the intake non-synchronous injection is advanced to the interval ensuring timing in a stepwise manner when switching the fuel injection process to the multiple injection process.

Example 5

In the controller according to any one of examples 2 to 4, the advancement process includes a process for gradually changing the injection start timing of the intake air non-synchronous injection to an injection start timing determined through the determination process when the injection start timing determined through the determination process is more advanced than a last value of the injection start timing of the intake air non-synchronous injection and the interval ensuring timing is not more advanced than the last value of the injection start timing of the intake air non-synchronous injection.

When the injection start timing of the intake non-synchronous injection is changed in a stepwise manner, the amount of fuel collecting in the intake passage suddenly changes. Consequently, the controllability of the air-fuel ratio may decrease. When the time interval between the end timing of the intake non-synchronous injection and the start timing of the intake synchronous injection is excessively short, the controllability of the port injection valve decreases. In fact, the intake non-synchronous injection and the intake synchronous injection overlap with each other. As a result, the injection period may deviate from the intended one. In the above-described configuration, even if the injection start timing of the intake non-synchronous injection is not set to be more advanced than the last injection start timing, when the intake non-synchronous injection and the intake synchronous injection do not overlap with each other, the injection start timing of the intake non-synchronous injection is gradually changed to the injection start timing determined through the determination process. This reduces decreases in the controllability of the air-fuel ratio caused when the injection start timing of the intake non-synchronous injection is advanced.

Example 6

In the controller according to any one of examples 1 to 5, the controller is further configured to execute a required injection amount calculation process for calculating a required injection amount used to control an air-fuel ratio to a target air-fuel ratio based on an amount of fresh air filling a combustion chamber of the internal combustion engine, and the multiple injection process includes a process for splitting the required injection amount into an injection amount of the intake air synchronous injection and an injection amount of the intake air non-synchronous injection.

In the above-described configuration, the intake non-synchronous injection and the intake synchronous injection allow for injection of the required injection amount of fuel used to control the air-fuel ratio to the target air-fuel ratio.

Example 7

A control method for controlling an internal combustion engine executes the processes described in examples 1 to 6.

Example 8

A non-transitory computer-readable storage medium that stores a program causing a processor to execute the control processes described in examples 1 to 6.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller 50 for an internal combustion engine 10 according to a first embodiment of the present disclosure will now be described with reference to the drawings.

Figure 1:
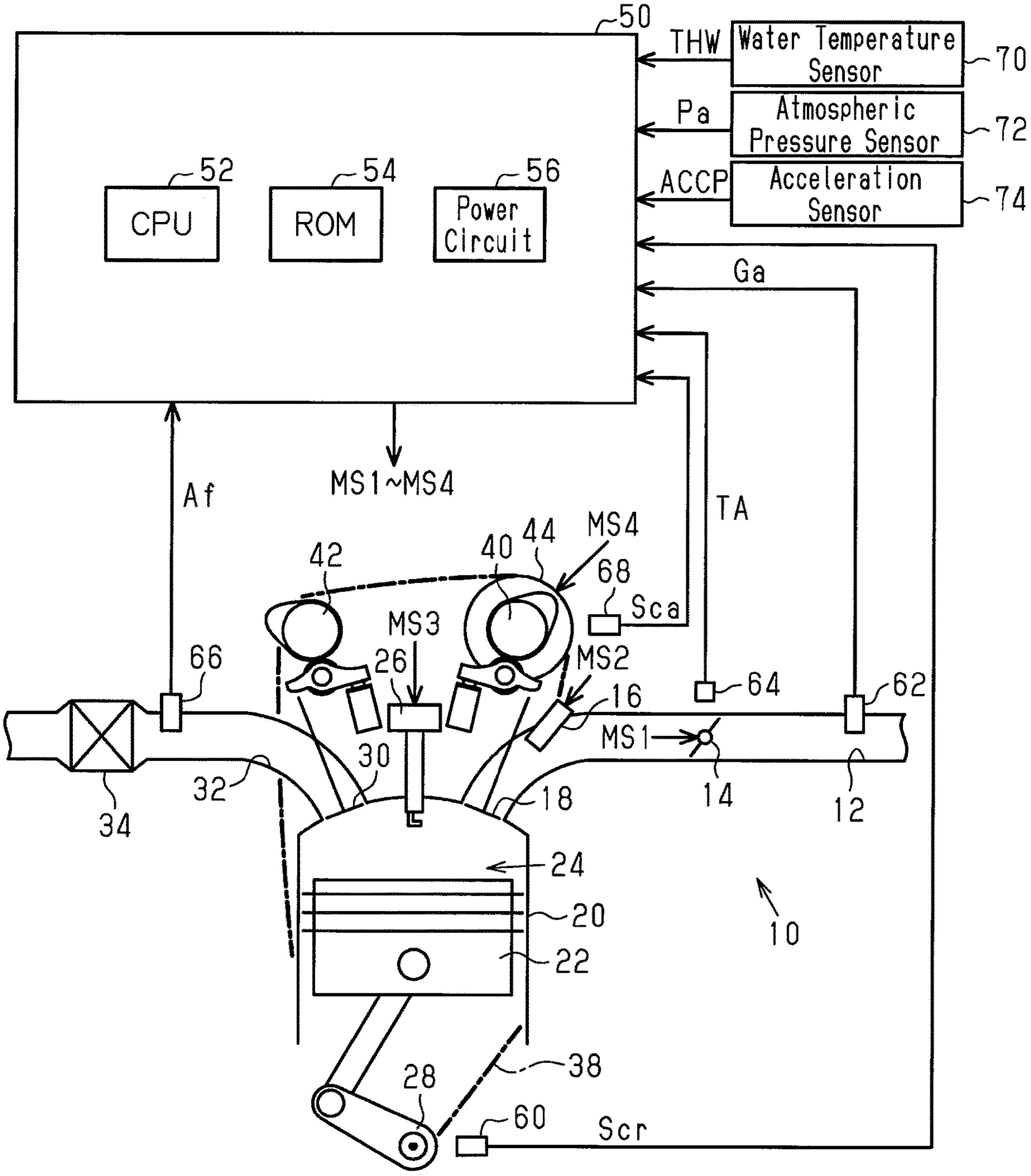
FIG. 1 is a diagram showing a controller and an internal combustion engine according to a first embodiment of the present disclosure.

The internal combustion engine 10 shown in FIG. 1 includes an intake passage 12. The intake passage 12 includes a throttle valve 14. A port injection valve 16 is arranged on the downstream side of the throttle valve 14. When an intake valve 18 opens, air drawn into the intake passage 12 and fuel injected from the port injection valve 16 flow into a combustion chamber 24, which is defined by a cylinder 20 and a piston 22. In the combustion chamber 24, the mixture of the fuel and the air is burned through spark discharge performed by an ignition device 26. Energy generated through the burning is converted by the piston 22 into rotation energy of a crankshaft 28. When an exhaust valve 30 opens, the burned mixture is discharged to an exhaust passage 32 as exhaust gas. The exhaust passage 32 includes a catalyst 34.

The rotating power of the crankshaft 28 is transmitted through a timing chain 38 to an intake camshaft 40 and an exhaust camshaft 42. In the first embodiment, the power of the timing chain 38 is transmitted to the intake camshaft 40 through an intake valve timing adjusting device 44. The intake valve timing adjusting device 44 is an actuator that adjusts the open timing of the intake valve 18 by adjusting the difference in rotation phase between the crankshaft 28 and the intake camshaft 40.

The control subject of the controller 50 is the internal combustion engine 10. In order to control, for example, the control amount of the internal combustion engine 10, that is, torque and exhaust components, the controller 50 operates the operation units of the internal combustion engine 10 such as the throttle valve 14, the port injection valve 16, the ignition device 26, and the intake valve timing adjusting device 44. When operating the operation units, the controller 50 refers to an output signal Scr of a crank angle sensor 60, an intake air amount Ga detected by an airflow meter 62, and an opening degree TA of the throttle valve 14 detected by a throttle sensor 64. Further, the controller 50 refers to an air-fuel ratio Af detected by an air-fuel ratio sensor 66, which is arranged in the exhaust passage 32, and an output signal Sca of an intake cam angle sensor 68. Additionally, the controller 50 refers to the temperature of coolant (water temperature THW) of the internal combustion engine 10 detected by a water temperature sensor 70, an atmospheric pressure Pa detected by an atmospheric pressure sensor 72, and the operation amount (accelerator operation amount ACCP) of the accelerator pedal detected by an acceleration sensor 74.

The controller 50 includes a CPU 52, a ROM 54, and a power circuit 56. When the CPU 52 executes programs stored in the ROM 54, the controller 50 controls the above-described control amount. The power circuit 56 supplies power to each section in the controller 50.

Figure 2:
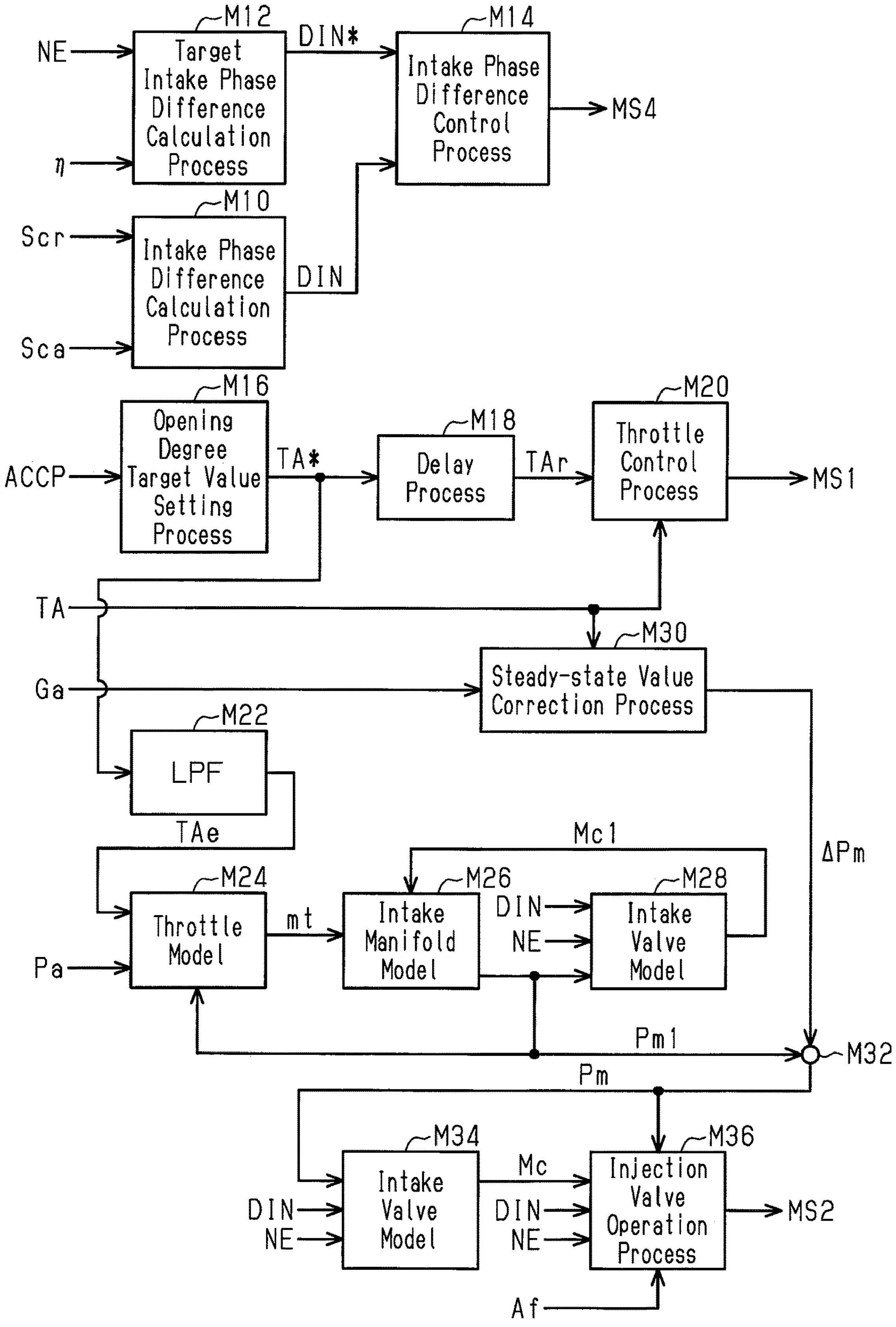
FIG. 2 is a block diagram illustrating some of the processes executed by the controller in the internal combustion engine shown in FIG. 1.

FIG. 2 illustrates some of the processes executed by the controller 50. The processes illustrated in FIG. 2 are implemented when the CPU 52 executes programs stored in the ROM 54.

An intake phase difference calculation process M10 is a process for calculating an intake phase difference DIN, which is the phase difference in the rotation angle of the intake camshaft 40 from the rotation angle of the crankshaft 28, based on the output signal Scr of the crank angle sensor 60 and the output signal Sca of the intake cam angle sensor 68. A target intake phase difference calculation process M12 is a process for variably setting a target intake phase difference DIN* based on the operating point of the internal combustion engine 10. In the first embodiment, a rotation speed NE and a charging efficiency η are used to define the operating point of the internal combustion engine 10. The CPU 52 calculates the rotation speed NE based on the output signal Scr of the crank angle sensor 60 and calculates the charging efficiency η based on the rotation speed NE and the intake air amount Ga. The charging efficiency η is a parameter that determines the amount of fresh air filling the combustion chamber 24.

An intake phase difference control process M14 is a process for outputting an operation signal MS4 to operate the intake valve timing adjusting device 44 in order to control the intake phase difference DIN to the target intake phase difference DIN*.

An opening degree target value setting process M16 is a process for setting a target value (target opening degree TA*) of the opening degree of the throttle valve 14 based on the accelerator operation amount ACCP. More specifically, the opening degree target value setting process M16 is a process for, for example, setting the target opening degree TA* to be a larger value when the accelerator operation amount ACCP is large than when the accelerator operation amount ACCP is small.

A delay process M18 is a process for calculating a delayed opening degree TAr in which the target opening degree TA* is delayed by a predetermined time. A throttle control process M20 is a process for outputting an operation signal MS1 to operate the throttle valve 14 in order to control the opening degree TA, which is detected by the throttle sensor 64, to the delayed opening degree TAr.

A low-pass filter M22 is a process for outputting a first-order lag processed value of the target opening degree TA* as a predicted opening degree TAe by taking into account the delay of an actual opening degree TA relative to a change in the target opening degree TA* when hypothetically controlling the actual opening degree TA to the target opening degree TA*.

A throttle model M24 is a process for calculating a throttle flow rate mt, which is the amount of air passing through the throttle valve 14, based on the predicted opening degree TAe, the atmospheric pressure Pa, and an intake pressure Pm1, which is calculated through a process described later. More specifically, the throttle model M24 is to calculate the throttle flow rate mt to a larger value when the atmospheric pressure Pa is high than when the atmospheric pressure Pa is low and to calculate the throttle flow rate mt to a smaller value when the intake pressure Pm1 is high than when the intake pressure Pm1 is low. Further, the throttle model M24 is to calculate the throttle flow rate mt to a larger value when the predicted opening degree TAe is large than when the predicted opening degree TAe is small. More specifically, the throttle model M24 is a process for calculating the throttle flow rate mt based on a model formula that associates the predicted opening degree TAe, the atmospheric pressure Pa, and the intake pressure Pm1, which are input parameters, with the throttle flow rate mt, which is an output parameter. The model formula does not have to directly associate the input parameters with the output parameter. Instead, for example, the coefficients of the formula may be variably set using input parameters.

An intake manifold model M26 is a process for calculating the intake pressure Pm1 based on the throttle flow rate mt and a valve-closing time inflow air amount Mc1, which is calculated through a process described later. The valve-closing time inflow air amount Mc1 is a value obtained by excluding, from the amount of air flowing into the combustion chamber 24 in a single combustion cycle, the amount of air flowing back to the intake passage 12 before the valve-closing timing of the intake valve 18. More specifically, the intake manifold model M26 is a process for calculating the intake pressure Pm1 such that the speed of the intake pressure Pm1 increases to a larger extent when a value obtained by subtracting the valve-closing time inflow air amount Mc1 from the throttle flow rate mt is large than when the value is small.

An intake valve model M28 is a process for calculating the valve-closing time inflow air amount Mc1 based on the intake pressure Pm1, the intake phase difference DIN, and the rotation speed NE. The intake valve model M28 is a process for calculating the valve-closing time inflow air amount Mc1 to be a larger value when the intake pressure Pm1 is high than when the intake pressure Pm1 is low. Further, in the intake valve model M28, when the valve-closing timing of the intake valve 18 is calculated to be more retarded than the bottom dead center (BDC), the valve-closing time inflow air amount Mc1 is calculated to be a smaller value as the intake phase difference DIN becomes more retarded.

A steady-state value correction process M30 is a process for calculating a correction amount ΔPm used to correct the intake pressure Pm1 to be a value corresponding to the intake air amount Ga in a steady state based on the intake air amount Ga and the opening degree TA. A correction process M32 is a process for calculating the intake pressure Pm by subtracting the correction amount ΔPm from the intake pressure Pm1. In the steady state, the intake pressure Pm corresponds to the intake pressure obtained from the intake air amount Ga. In a transient state, the intake pressure Pm is a value in which importance is placed on the responsiveness of the intake pressure Pm1.

The steady-state value correction process M30 simply needs to be, for example, a process for estimating the intake pressure to execute two processes, namely, a first estimation process and a second estimation process, and calculating the difference between the intake pressures obtained through the two processes as the correction amount ΔPm. More specifically, in the first estimation process, the opening degree TA is used as an input instead of the predicted opening degree TAe while using the same model as the throttle model M24, the intake manifold model M26, and the intake valve model M28. In the second estimation process, the intake air amount Ga is used as an input instead of the throttle flow rate mt using the same model as the intake manifold model M26 and the intake valve model M28. In the steady state, the intake pressure estimated through the first estimation process is based on an amount corresponding to the throttle flow rate mt. Thus, in the steady state, the correction amount ΔPm is a value that compensates for an error in the intake air amount Ga of the throttle flow rate mt. In the transient state, the responsiveness of the intake pressure estimated through the first estimation process is approximate to the responsiveness of the intake pressure estimated through the second estimation process. Thus, in the transient state, the correction amount ΔPm is a value that allows a change in the intake pressure Pm1 to be apparent in the intake pressure Pm.

The intake valve model M34 is a process for calculating the valve-closing time inflow air amount Mc, which serves as an output parameter, based on the intake pressure Pm, the intake phase difference DIN, and the rotation speed NE, which serve as input parameters. Although the intake valve model M34 differs from the intake valve model M28 in input parameter, the process for calculating an output parameter based on an input parameter is executed in the same manner as the process of the intake valve model M28.

The valve-closing time inflow air amount Mc is a predicted value of the amount of air drawn into the combustion chamber 24 in the future for a predetermined period. This is because while the throttle valve 14 is controlled to the delayed opening degree TAr, the valve-closing time inflow air amount Mc is a value in which the opening degree of the throttle valve 14 corresponds to an actual opening degree predicted from the target opening degree TA*.

An injection valve operation process M36 is a process for operating the port injection valve 16 by acquiring the valve-closing time inflow air amount Mc, the intake phase difference DIN, the rotation speed NE, the intake pressure Pm, and the air-fuel ratio Af.

Figure 3:
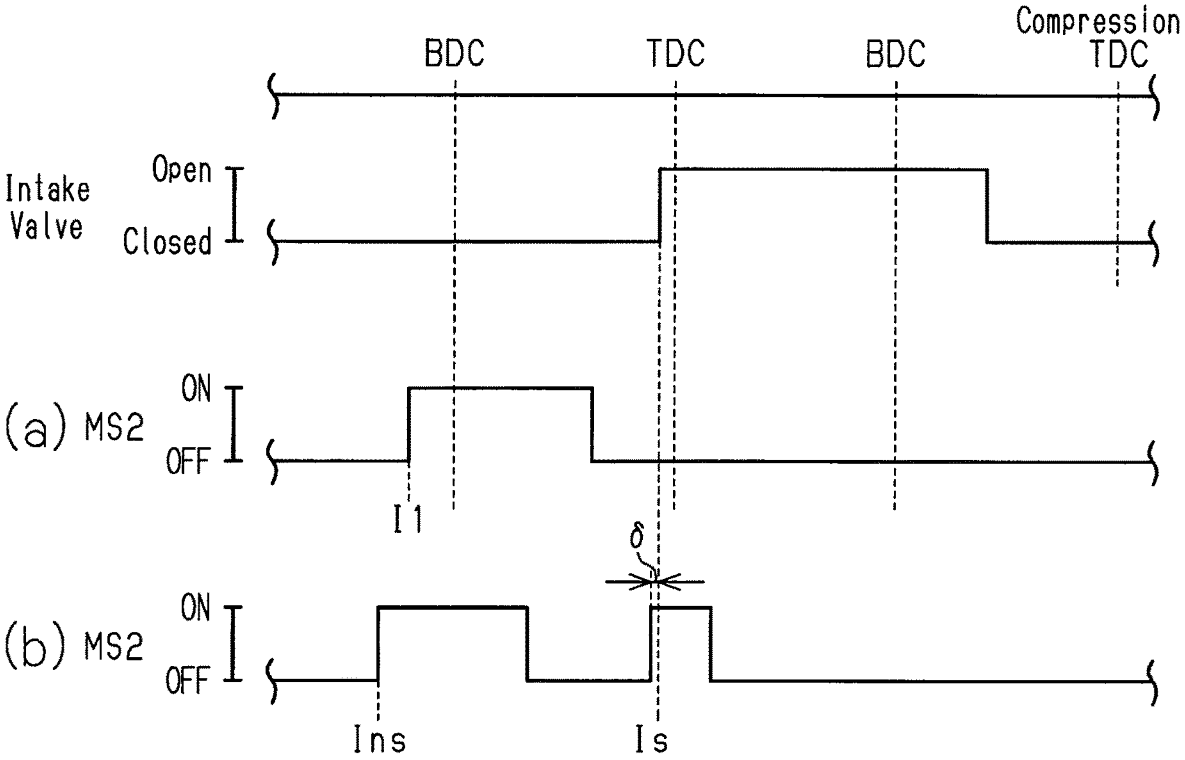
FIG. 3 is a time chart including sections (a) and (b), which respectively illustrate a single injection process and a multiple injection process in the internal combustion engine shown in FIG. 1.

In the first embodiment, the fuel injection process includes two processes, namely, a process described in section (a) of FIG. 3 and a process described in section (b) of FIG. 3.

In FIG. 3, section (a) illustrates a single injection process for starting fuel injection before the intake valve 18 opens and executing a single injection that ends fuel injection before the intake valve 18 opens.

In FIG. 3, section (b) illustrates a multiple injection process for executing two types of fuel injection, namely, intake air synchronous injection and intake air non-synchronous injection. In the intake air synchronous injection, fuel injection is started at a synchronous injection start timing Is in synchronization with the opening period of the intake valve 18. In the intake air non-synchronous injection, fuel injection is started at a non-synchronous injection start timing Ins, which is more advanced than the timing of the intake air synchronous injection. In the first embodiment, the synchronous injection start timing Is is set to be more advanced by a micro-time 6 than the open timing of the intake valve 18, which is shown by the dotted line extending over sections (a) and (b) in FIG. 3. The micro-time 6 is set to a time for fuel injected from the port injection valve 16 to reach the position of the intake valve 18 before opening. This setting causes the injected fuel to flow into the combustion chamber 24 as quickly as possible when the intake valve 18 opens. While the process illustrated in section (a) of FIG. 3 is a process of executing only the intake air non-synchronous injection, the injection start timing of the single injection process is referred to as a single injection start timing I1 instead of the non-synchronous injection start timing Ins for illustrative purposes.

In the first embodiment, the multiple injection process is executed in order to reduce PN. That is, in a case in which the single injection process is executed when the water temperature THW is relatively low and the charging efficiency η is relatively high, PN tends to increase. This may be because since the amount of fuel injected from the port injection valve 16 is larger when the charging efficiency η is high than when the charging efficiency η is low, the amount of fuel collecting in the intake passage 12 increases. More specifically, when the amount of fuel collecting in the intake passage 12 is relatively large, shearing of the collected fuel may cause part of the collected fuel to flow into the combustion chamber 24 as liquid drops. In the first embodiment, the amount of fuel injected from the port injection valve 16 is partially injected through the intake air synchronous injection when the charging efficiency η is relatively high. This reduces the amount of fuel collecting in the intake passage 12, thereby reducing PN.

Figure 4:
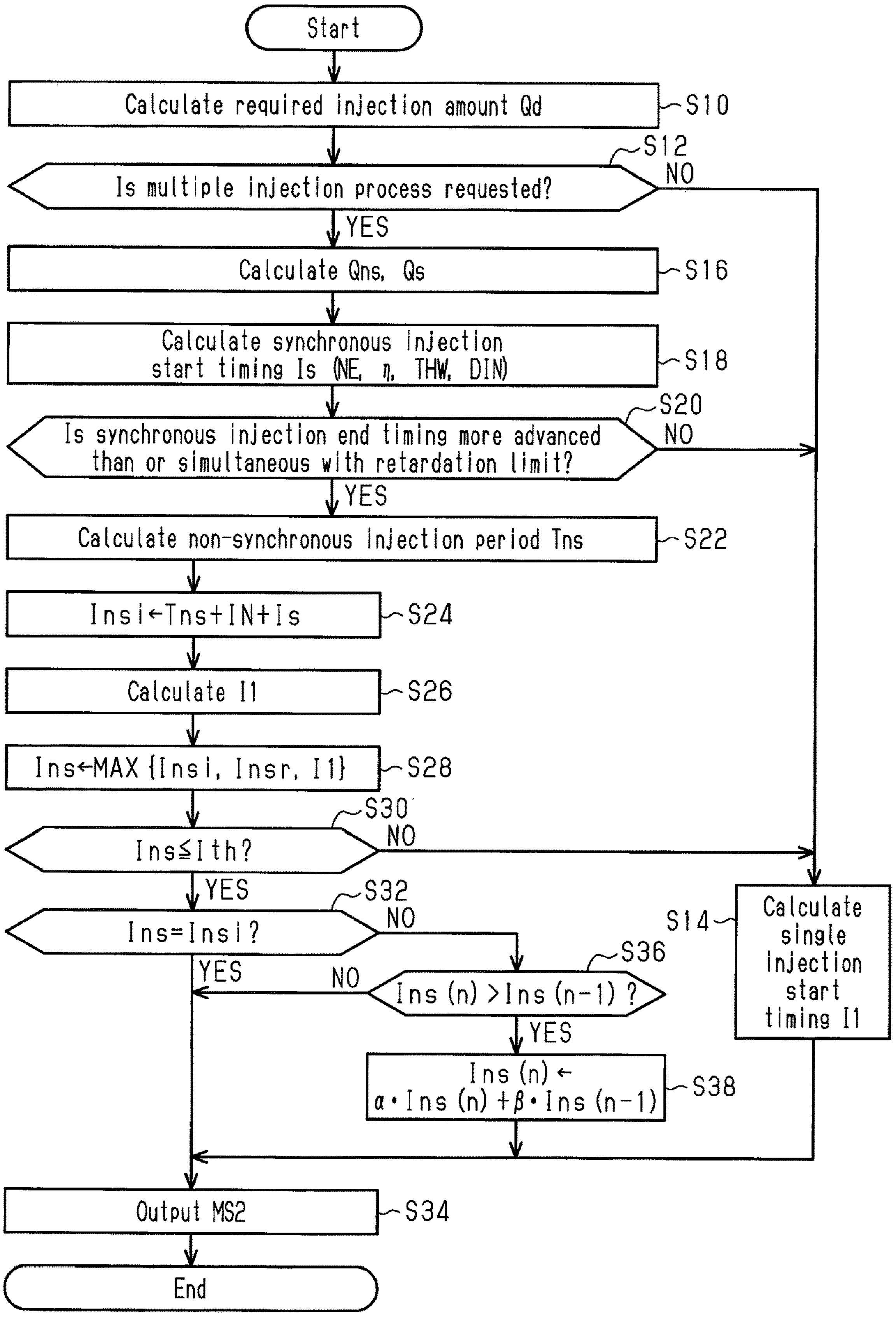
FIG. 4 is a flowchart illustrating the procedures of an injection valve operation process in the internal combustion engine shown in FIG. 1.

FIG. 4 illustrates the procedures of processes of the injection valve operation process M36. The processes illustrated in FIG. 4 are implemented when the CPU 52 repeatedly executes the program stored in the ROM 54, for example, in a predetermined cycle. In the following description, the step number of each process is represented by a number in front of which the character S is given.

In a series of processes illustrated in FIG. 4, the CPU 52 first calculates a required injection amount Qd, which is the amount of fuel required to be injected from the port injection valve 16 in one cylinder in one combustion cycle (S10). In S10, the CPU 52 calculates a base injection amount Qb, which is the amount of injection used to perform open-loop control for the air-fuel ratio so that the air-fuel ratio is a target value based on the valve-closing time inflow air amount Mc. More specifically, the CPU 52 calculates the charging efficiency η from the ratio of the valve-closing time inflow air amount Mc to the maximum value of the amount of fresh air filling the combustion chamber 24. The CPU 52 then calculates the base injection amount Qb by multiplying the calculated charging efficiency η by the amount of injection required to set the air-fuel ratio to a target air-fuel ratio relative to the amount of air having the maximum value. Further, the CPU 52 calculates an air-fuel ratio correction coefficient Kfb as an operation amount used to perform feedback control for the air-fuel ratio Af so that the air-fuel ratio Af is a target value. The CPU 52 then calculates the required injection amount Qd by multiplying the base injection amount Qb by air-fuel ratio correction coefficient Kfb.

Subsequently, the CPU 52 determines whether a request for executing the multiple injection process has been issued (S12). When the logical conjunction of condition (i) that the water temperature THW is less than or equal to a preset temperature (for example, 70° C.), condition (ii) that the charging efficiency η is greater than or equal to a preset value, and condition (iii) that the rotation speed NE is less than or equal to a predetermined speed NEth, is true, the CPU 52 determines that execution of the multiple injection process is requested. Condition (iii) is a condition for ensuring a time interval between the end timing of the intake air non-synchronous injection and the start timing of the intake air synchronous injection. Also, since the multiple injection process has a larger calculation load than the single injection process, condition (iii) is used to prevent the heat generation from being excessive due to increases in the calculation load on the controller 50.

When the CPU 52 determines that the multiple injection process is not requested (S12: NO), the CPU 52 calculates the single injection start timing I1 based on, for example, the water temperature THW (S14). Then, the CPU 52 operates the port injection valve 16 by outputting an operation signal MS2 to the port injection valve 16 in order to inject the required injection amount Qd of fuel during a one-time fuel injection when the injection start timing enters the single injection start timing I1 (S34).

When the CPU 52 determines that a request for executing the multiple injection process has been issued requested (S12: YES), the CPU 52 splits the request injection amount Qd to calculate a non-synchronous injection amount Qns, which is the injection amount of the intake air non-synchronous injection, and a synchronous injection amount Qs, which is the injection amount of the intake air synchronous injection (S16). The CPU 52 splits the required injection amount Qd in accordance with the rotation speed NE, the charging efficiency η, the water temperature THW, and the intake phase difference DIN. More specifically, the CPU 52 performs map calculation for the synchronous injection amount Qs in a state in which the ROM 54 already stores map data that includes the rotation speed NE, the charging efficiency η, the water temperature THW, and the intake phase difference DIN as input variables and the synchronous injection amount Qs as an output variable. The CPU 52 sets the non-synchronous injection amount Qns to be a value obtained by subtracting the synchronous injection amount Qs from the required injection amount Qd.

Map data refers to a set of data including the discrete values of input invariables and the values of output variables that respectively correspond to the values of the input variables. In the map calculation, for example, when the value of an input variable coincides with any one of the input variables of a map data, the value of the corresponding output variable of the map data is treated as a calculation result. Further, when such a coincidence does not occur, a value obtained through interpolation of the output variables included in the map data is treated as a calculation result.

Subsequently, the CPU 52 calculates the synchronous injection start timing Is as an advancement amount from a reference position such as the compression top dead center (TDC) based on the rotation speed NE, the charging efficiency η, the water temperature THW, and the intake phase difference DIN (S18). This process is implemented when the CPU 52 performs map calculation for the synchronous injection start timing Is in a state in which the ROM 54 already stores map data that includes the rotation speed NE, the charging efficiency η, the water temperature THW, and the intake phase difference DIN as input parameters and the synchronous injection start timing Is as an output variable.

Thus, in the first embodiment, the synchronous injection start timing Is is set independently from the non-synchronous injection start timing Ins. This is because the synchronous injection start timing Is is easily affected in particular by PN and HC during emission.

Figure 5A:
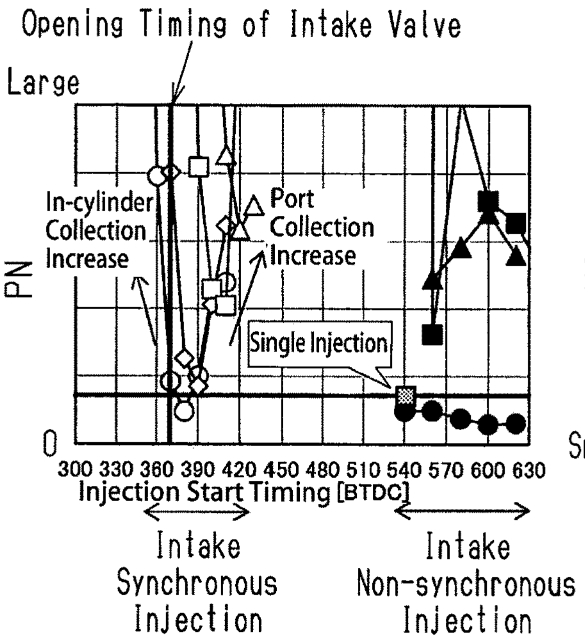
FIG. 5A is a graph illustrating the relationship between an injection start timing and PN in the internal combustion engine shown in FIG. 1.
Figure 5B:
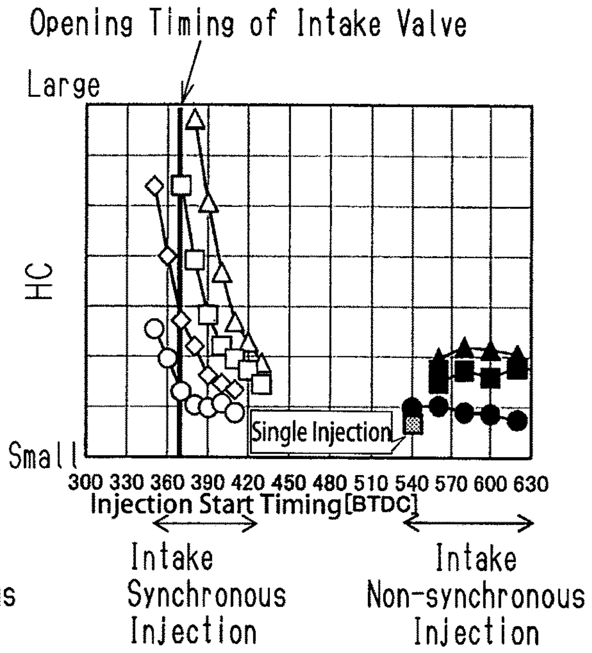
FIG. 5B is a graph illustrating the relationship between the injection start timing and HC in the internal combustion engine shown in FIG. 1.

FIG. 5A shows PN when the non-synchronous injection start timing Ins and the synchronous injection start timing Is are changed. FIG. 5B shows the generation amount of HC when the non-synchronous injection start timing Ins and the synchronous injection start timing Is are changed. In FIGS. 5A and 5B, the white plotted points indicate parameters in which the non-synchronous injection start timing Ins is fixed and the synchronous injection start timing Is is changed, and the black plotted points indicate parameters in which the synchronous injection start timing Is is fixed and the non-synchronous injection start timing Ins is changed. The circle plotted points, diamond plotted points, square plotted points, and triangle plotted points respectively correspond to 8:2, 7:3, 6:4, and 5:5 in the ratio of the non-synchronous injection amount Qns and the synchronous injection amount Qs. In addition to the black plotted points, PN and HC during single injection are also described.

As shown by the white plotted points in FIGS. 5A and 5B, when the synchronous injection start timing Is changes, the generation amounts of PN and HC change greatly. Thus, in the first embodiment, the synchronous injection start timing Is is set to an appropriate value that allows the generation amounts of PN and HC to be reduced.

Referring back to FIG. 4, the CPU 52 determines whether an end timing Ise of the intake air synchronous injection, which is determined by the synchronous injection start timing Is and a synchronous injection amount Qs, is more advanced than or simultaneous with a retardation limit (S20). That is, the CPU 52 determines whether the end timing Ise of the intake air synchronous injection is the retardation limit or a value that is more advanced than the retardation limit (S20). The retardation limit is a limit value in which PN does not increase markedly. That is, there is a tendency for PN to increase because of collection of fuel on the inner wall surface of the cylinder 20 when the end timing Ise of synchronous injection is excessively retarded.

When the CPU 52 determines that the end timing Ise of the intake air synchronous injection is more retarded than the retardation limit (S20: NO), the CPU 52 proceeds to the process of S14. When the CPU 52 determines that the end timing Ise of the intake air synchronous injection is more advanced than or simultaneous with the retardation limit (S20: YES), the CPU 52 calculates a non-synchronous injection period Tns, which is a crank angle interval in which non-synchronous injection is performed based on the rotation speed NE and the non-synchronous injection amount Qns (S22). That is, a negative determination is made in S20 when the end timing Ise of the intake air synchronous injection is more retarded than the retardation limit, and an affirmative determination is made in S20 when the end timing Ise of the intake air synchronous injection corresponds to the retardation limit or is more advanced than the retardation limit. The non-synchronous injection period Tns has a crank angle interval as a standard and is thus calculated using the rotation speed NE.

Then, the CPU 52 substitutes the sum of the non-synchronous injection period Tns, the synchronous injection start timing Is, and an interval IN into an interval ensuring timing Insi (S24). At the interval ensuring timing Insi, the time interval between the end timing of the intake air non-synchronous injection and the synchronous injection start timing Is is the interval IN (predetermined interval). The interval IN is the smallest crank angle interval in which injection with the port injection valve 16 can be started, stopped, and resumed.

Subsequently, the CPU 52 calculates the single injection start timing I1 by performing the same process as the process of S14 (S26). The CPU 52 substitutes the most advanced value among the interval ensuring timing Insi, the single injection start timing I1, and a reference start timing Insr into the non-synchronous injection start timing Ins (S28).

Figure 6:
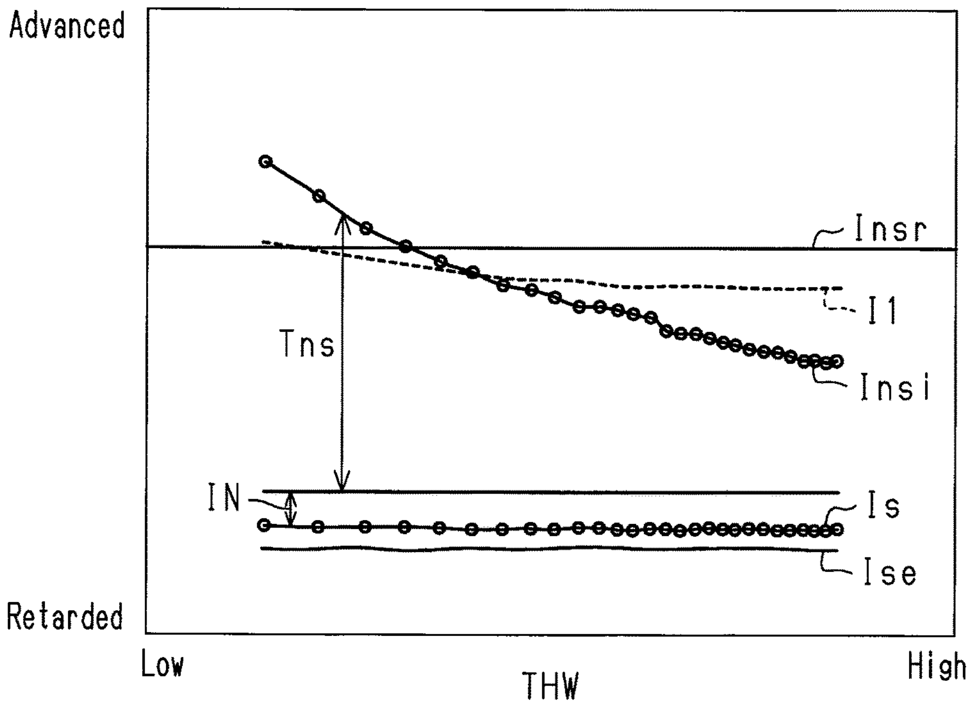
FIG. 6 is a graph illustrating the injection start timing of an intake air non-synchronous injection in the internal combustion engine shown in FIG. 1.

FIG. 6 shows the interval ensuring timing Insi, the reference start timing Insr, and the single injection start timing I1 that correspond to the water temperature THW. As shown in FIG. 6, the reference start timing Insr is the most advanced value in a region where the water temperature THW is relatively high, and the interval ensuring timing Insi is the most advanced value in a region where the water temperature THW is low. In the first embodiment, while the reference start timing Insr is partially more retarded than the single injection start timing I1 in the region where the water temperature THW is low, the reference start timing Insr is basically more advanced than the single injection start timing I1. This is because since the intake air non-synchronous injection in the multiple injection process allows the amount of injection to be reduced as compared to the single injection process, the amount of fuel collecting in the intake valve 18 is small even if the non-synchronous injection start timing Ins is set to be more advanced than the single injection start timing I1, thereby limiting prevention of atomization. In FIG. 5A, the black circles indicate that the non-synchronous injection start timing Ins of the multiple injection process is advanced as compared to when single injection is performed, thereby reducing PN.

Referring back to FIG. 4, the CPU 52 determines whether the non-synchronous injection start timing Ins is more retarded than or simultaneous with an advancement limit Ith (S30). The advancement limit is, for example, an upper limit value of the non-synchronous injection start timing Ins, at which the prediction accuracy of the valve-closing time inflow air amount Mc used to calculate the base injection amount Qb is tolerable. When the CPU 52 determines that the non-synchronous injection start timing Ins is more advanced than the advancement limit Ith (S30: NO), the CPU 52 proceeds to the process of S14. When the CPU 52 determines that the non-synchronous injection start timing Ins is more retarded than or simultaneous with the advancement limit Ith (S30: YES), the CPU 52 determines whether the non-synchronous injection start timing Ins corresponds to the interval ensuring timing Insi (S32). That is, a negative determination is made in S30 when the non-synchronous injection start timing Ins is more advanced than the advancement limit Ith, and an affirmative determination is made in S30 when the non-synchronous injection start timing Ins corresponds to or is more retarded than the advancement limit Ith. When the CPU 52 determines that the non-synchronous injection start timing Ins corresponds to the interval ensuring timing Insi (S32: YES), the CPU 52 operates the port injection valve 16 by outputting the operation signal MS2 to the port injection valve 16 such that the non-synchronous injection amount Qns of fuel is injected at the non-synchronous injection start timing Ins and the synchronous injection amount Qs of fuel is injected at the synchronous injection start timing Is (S34).

When the CPU 52 determines that the non-synchronous injection start timing Ins does not correspond to the interval ensuring timing Insi (S32: NO), the CPU 52 determines whether the current non-synchronous injection start timing Ins(n) is greater than the last non-synchronous injection start timing Ins(n−1) (S36). In a case in which the single injection process was executed last time, the last single injection start timing I1 is substituted into the last non-synchronous injection start timing Ins(n−1). When the CPU 52 determines that the current non-synchronous injection start timing Ins(n) is more retarded than or synchronous with the last non-synchronous injection start timing Ins(n−1) (S36: NO), the CPU 52 operates the port injection valve 16 by outputting the operation signal MS2 to the port injection valve 16 such that the non-synchronous injection amount Qns of fuel is injected at the non-synchronous injection start timing Ins and the synchronous injection amount Qs of fuel is injected at the synchronous injection start timing Is (S34). When the CPU 52 determines that the current non-synchronous injection start timing Ins(n) is greater than the last non-synchronous injection start timing Ins(n−1) (S36: YES), the CPU 52 substitutes an exponential moving average processed value of the current non-synchronous injection start timing Ins(n) and the last non-synchronous injection start timing Ins(n−1) into the current non-synchronous injection start timing Ins (n) (S38). This is a gradually-changing process for limiting sudden changes in the non-synchronous injection start timing Ins.

Figure 7:
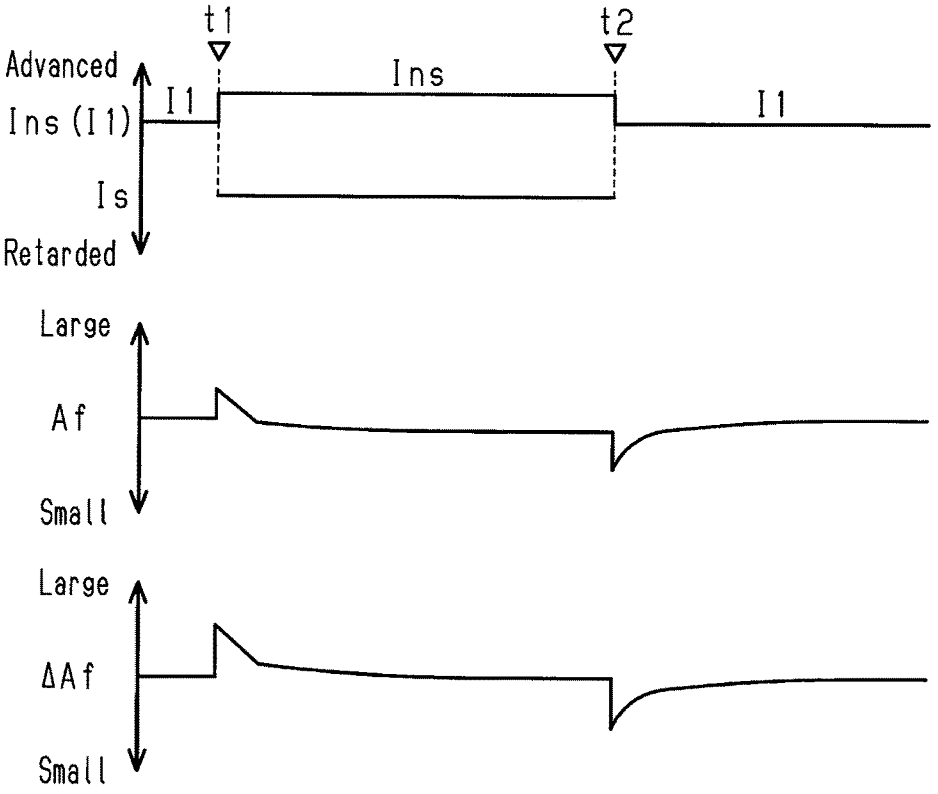
FIG. 7 is a time chart illustrating the problem to be solved in the internal combustion engine shown in FIG. 1.

FIG. 7 shows changes in the air-fuel ratio Af in a case in which the gradually-changing process is not executed when the injection process is switched from one of the two processes, namely, the single injection process and the multiple injection process, to the other. FIG. 7 shows that the injection process is switched from the single injection process to the multiple injection process at time t1 and the injection process is switched from the multiple injection process to the single injection process at time t2. FIG. 7 also shows a change amount ΔAf of the last air-fuel ratio Af. As shown in FIG. 7, in a case in which the injection process is switched from one of the two processes, namely, the single injection process and the multiple injection process, to the other when the non-synchronous injection start timing Ins is more advanced than the single injection start timing I1, the air-fuel ratio Af changes markedly if the gradually-changing process is not executed. This may be mainly because the setting of the non-synchronous injection start timing Ins to be more advanced than the single injection start timing I1 changes the amount of fuel collecting in the intake passage 12.

The process of S36 in FIG. 4 is a process for reducing a large gap between the single injection start timing I1 and non-synchronous injection start timing Ins that occurs mainly when the injection process is switched from the single injection process to the multiple injection process. Although the switching from the multiple injection process to the single injection process is not illustrated in FIG. 4, it is preferred that the gradually-changing process be executed when the gap between the single injection start timing I1 and the non-synchronous injection start timing Ins is large.

When the CPU 52 completes the process of S34, the CPU 52 ends the series of processes shown in FIG. 4.

The operation and advantages of the first embodiment will now be described.

When the CPU 52 executes the multiple injection process, the CPU 52 sets the most advanced timing among the interval ensuring timing Insi, the reference start timing Insr, and the single injection start timing I1 to the non-synchronous injection start timing Ins. Thus, the non-synchronous injection start timing Ins is basically more advanced than the single injection start timing I1. Accordingly, the time interval from the non-synchronous injection start timing Ins to the combustion stroke is lengthened as compared to when, for example, the non-synchronous injection start timing Ins corresponds to the single injection start timing I1. This promotes fuel atomization.

Figure 8A:
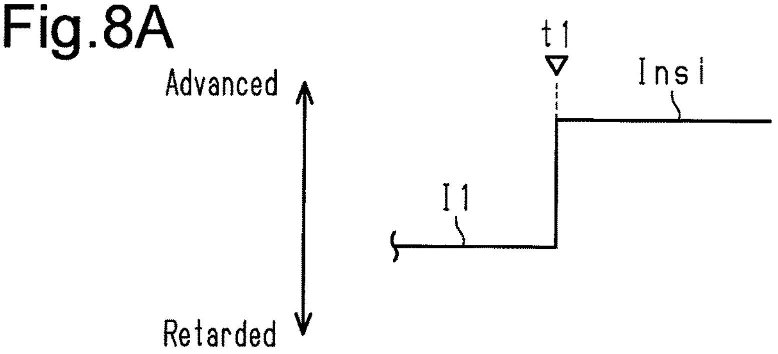
FIG. 8A is a time chart illustrating an operation of the internal combustion engine shown in FIG. 1.

As shown in FIG. 8A, in a case in which the non-synchronous injection start timing Ins is the interval ensuring timing Insi when the injection process is switched from the single injection process to the multiple injection process at time t1, the CPU 52 causes the non-synchronous injection start timing Ins to change to the interval ensuring timing Insi in a stepwise manner. Thus, the time interval is sufficiently ensured between the end timing of the intake air non-synchronous injection and the synchronous injection start timing Is. This sufficiently restricts situations in which an operation for the intake air synchronous injection is performed to keep the port injection valve 16 open before the port injection valve 16 is opened by ending the operation of the port injection valve 16 for the intake air non-synchronous injection. Decreases in controllability of the air-fuel ratio caused when the port injection valve 16 are kept open are larger than decreases in controllability of the air-fuel ratio caused when the injection start timing is changed in a stepwise manner. Thus, when the interval IN is ensured, decreases in controllability of the air-fuel ratio are limited.

Figure 8B:
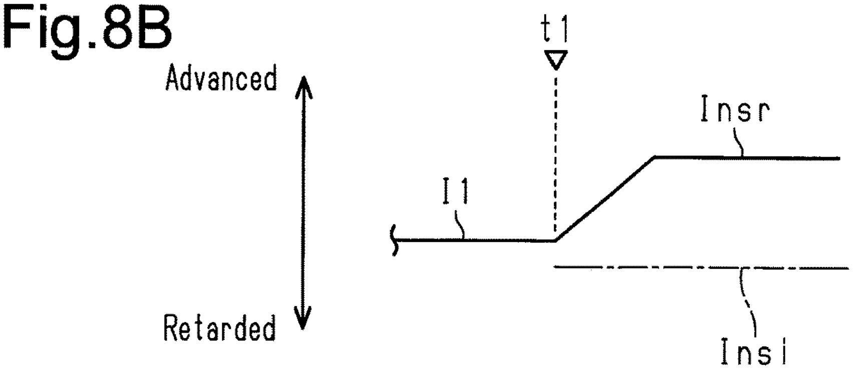
FIG. 8B is a time chart illustrating an operation of the internal combustion engine shown in FIG. 1.

FIG. 8B shows a case in which the interval ensuring timing Insi is more retarded than the single injection start timing I1 and the reference start timing Insr is more advanced than the single injection start timing I1 when the CPU 52 switches the injection process from the single injection process to the multiple injection process at time t1. In this case, the CPU 52 executes the gradually-changing process for gradually approximating the non-synchronous injection start timing Ins to the reference start timing Insr. This limits sudden decreases in the amount of fuel collecting in the intake passage 12 and limits sudden increases in the amount of fuel supplied into the combustion chamber 24. The air-fuel ratio feedback control compensates for the influence on the catalyst 34 caused by a small deviation of the air-fuel ratio in the combustion chamber 24 from a target value to the rich side.

Second Embodiment

A second embodiment will now be described with reference to FIGS. 9 and 10, focusing on the difference from the first embodiment.

Figure 9:
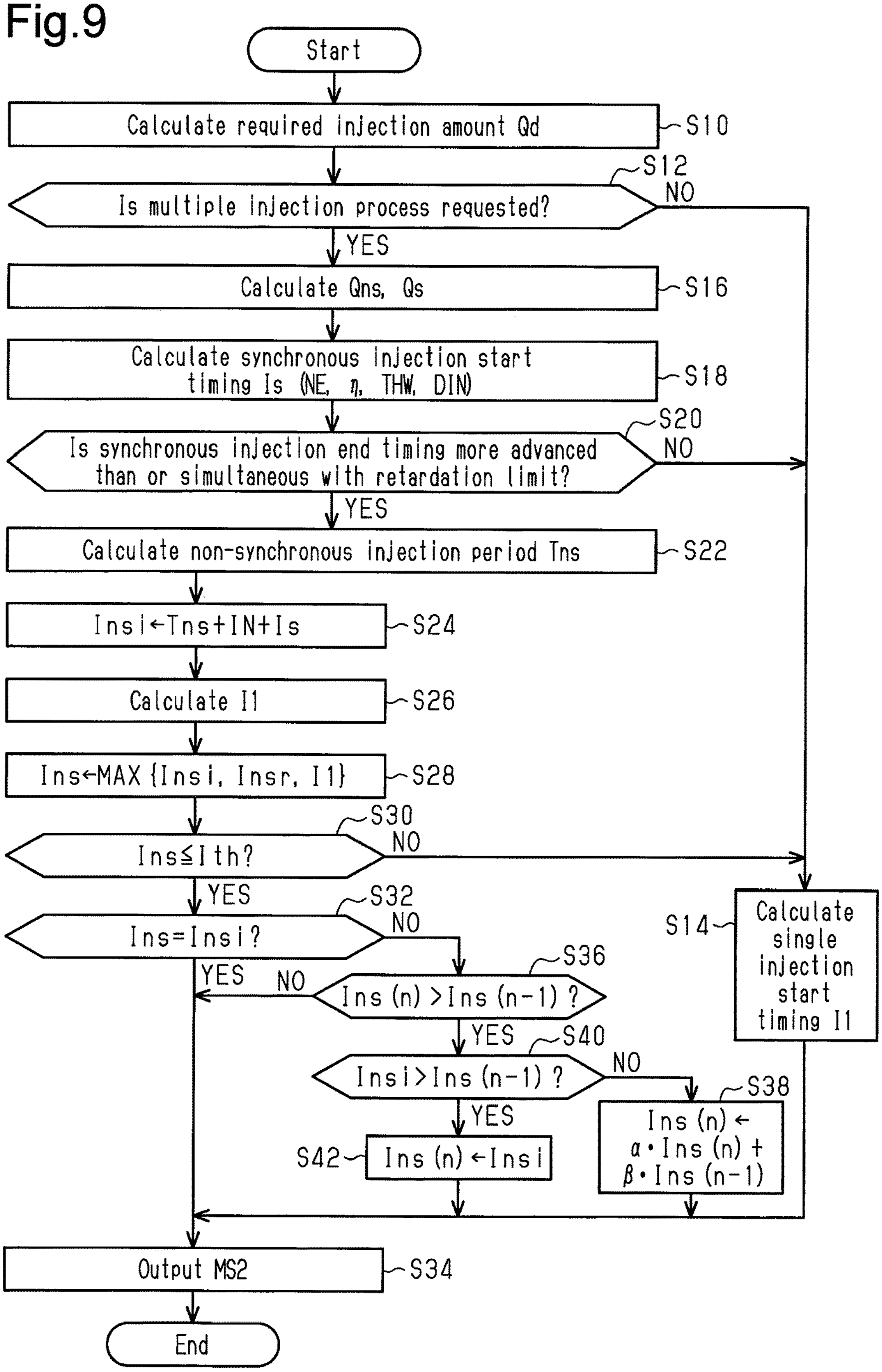
FIG. 9 is a flowchart illustrating the procedures of an injection valve operation process according to a second embodiment of the present disclosure.

The processes illustrated in FIG. 9 are implemented when the CPU 52 repeatedly executes the program stored in the ROM 54, for example, in a predetermined cycle. In FIG. 9, the same step numbers are given to the processes corresponding to the processes illustrated in FIG. 4 for illustrative purposes.

In a series of processes shown in FIG. 9, when the CPU 52 makes an affirmative determination in the process of S36, the CPU 52 determines whether the interval ensuring timing Insi is greater than the last non-synchronous injection start timing Ins(n−1) (S40). When the CPU 52 determines that the interval ensuring timing Insi is greater than the last non-synchronous injection start timing Ins(n−1) (S40: YES), the CPU 52 substitutes the interval ensuring timing Insi into the non-synchronous injection start timing Ins (S42) and then proceeds to the process of S34. When the CPU 52 determines that the interval ensuring timing Insi is more retarded than or more synchronous than the last non-synchronous injection start timing Ins(n−1) (S40: NO), the CPU 52 proceeds to the process of S38.

The operation and advantages of the second embodiment will now be described.

Figure 10:
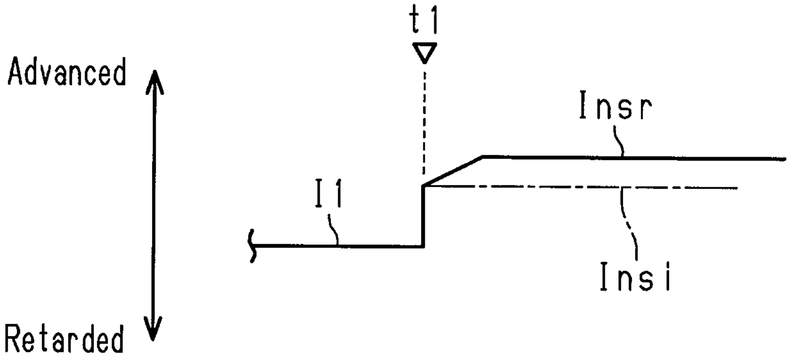
FIG. 10 is a time chart illustrating an operation of the internal combustion engine shown in FIG. 9.

As shown in FIG. 10, the CPU 52 switches the injection process from the single injection process to the multiple injection process at time t1. When the interval ensuring timing Insi is more advanced than the single injection start timing I1 and the reference start timing Insr is more advanced than the interval ensuring timing Insi, the CPU 52 sets the non-synchronous injection start timing Ins to the interval ensuring timing Insi in a stepwise manner. Then, the CPU 52 gradually advances the non-synchronous injection start timing Ins to the reference start timing Insr from the next time. This limits sudden changes in the injection start timing as much as possible while ensuring the time interval between the injection end timing of the intake air synchronous injection and the synchronous injection start timing Is.

Third Embodiment

A third embodiment will now be described with reference to FIG. 11, focusing on the difference from the first embodiment.

Figure 11:
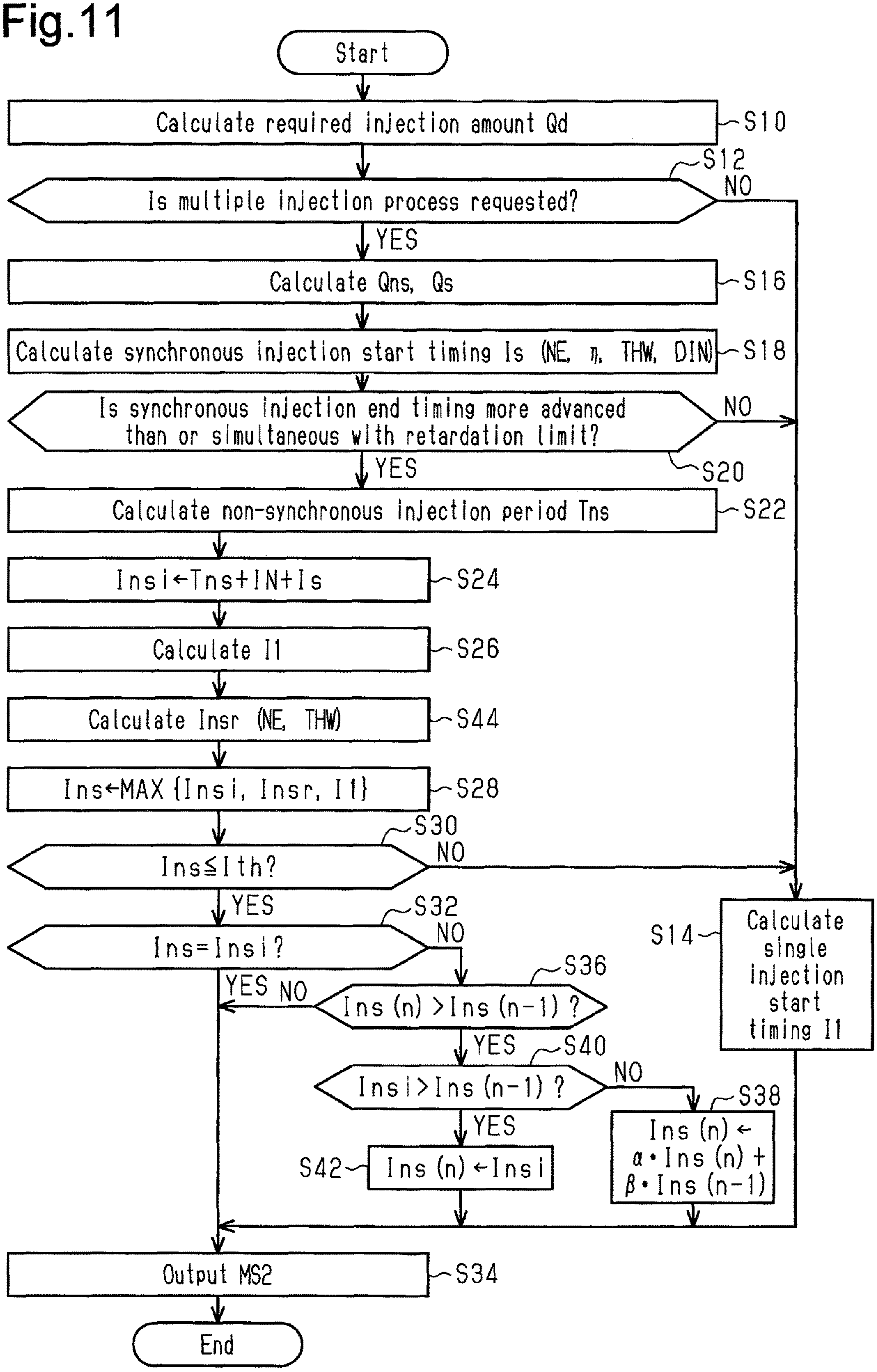
FIG. 11 is a flowchart illustrating the procedures of an injection valve operation process according to a third embodiment of the present disclosure.

The processes illustrated in FIG. 11 are implemented when the CPU 52 repeatedly executes the program stored in the ROM 54, for example, in a predetermined cycle. In FIG. 11, the same step numbers are given to the processes corresponding to the processes illustrated in FIG. 9 for illustrative purposes.

In a series of processes shown in FIG. 11, when the CPU 52 completes the process of S26, the CPU 52 calculates the reference start timing Insr based on the rotation speed NE and the water temperature THW (S44) and then proceeds to the step of S28. The CPU 52 calculates the value of the reference start timing Insr to be more advanced when the rotation speed NE is high than when the rotation speed NE is low. This is because rotation by the same rotation angle requires a shorter time when the rotation speed NE is high than when the rotation speed NE is low, and thus the time interval between the non-synchronous injection start timing Ins and the combustion stroke is shortened when the rotation speed NE is high in a case in which, for example, the reference start timing Insr is a fixed value. Additionally, even if the non-synchronous injection start timing Ins is advanced when the rotation speed NE is high, the previously-calculated valve-closing time inflow air amount Mc remains accurate as a predicted value of the amount of fresh air subject to combustion in the combustion chamber 24 in an actual combustion stroke.

Further, when the water temperature THW is excessively low, contribution to atomization is not easily achieved even if the non-synchronous injection start timing Ins is advanced. Thus, the CPU 52 sets the reference start timing Insr to be more retarded when the water temperature THW is low than when the water temperature THW is high.

Correspondence

The correspondence between the matters in the above-described embodiment and the matters described in the section SUMMARY is as follows. Hereinafter, the correspondence relationship is shown for every number in the example described in the section SUMMARY.

[1] The fuel injection process corresponds to the processes of S12 to S16 and S34. The advancement process corresponds to the processes of S18 to S32, S36, and S38 in FIG. 4, the processes of S18 to S32, S36, S38, S40, and S42 in FIG. 9, and the processes of S18 to S32, S36, S38, and S40-S44 in FIG. 11.

[2] The synchronization start calculation process corresponds to the process of S18.

The ensuring timing calculation process corresponds to the process of S24. The determination process corresponds to the process of S28.

[3] The non-synchronous start timing calculation process corresponds to the process of S44.

[4] Example 4 corresponds to execution of the process of S42 when an affirmative determination is made in the process of S40 and corresponds to FIG. 10. Example 4 also corresponds to the process performed when Insi is greater than Ins(n−1) and an affirmative determination is made in the process of S42.

[5] Example 5 corresponds to the process of S38 when Insi is more retarded than or synchronous with Ins(n−1) in FIG. 4 and the process of S38 when a negative determination is made in the process of S40 in FIGS. 9 and 11.

[6] The required injection amount calculation process corresponds to the process of S10.

Modifications

The above-described embodiments may be modified as described below. The above-described embodiments and the following modifications may be implemented in combination with each other as long as technical contradiction does not occur.

Determination Process

The determination process is not limited to the process for determining the non-synchronous injection start timing Ins to the most advanced timing among the interval ensuring timing Insi, the single injection start timing I1, the reference start timing Insr. For example, the determination process may be a process for determining the non-synchronous injection start timing Ins at the most advanced timing of two timings, namely, the interval ensuring timing Insi and the reference start timing Insr.

Non-Synchronous Start Timing Calculation Process

In the process of S44 in FIG. 11, the reference start timing Insr is variably set based on the rotation speed NE and the water temperature THW. Instead, for example, the reference start timing Insr may be variably set based on only one of the two parameters, namely, the rotation speed NE and the water temperature THW.

Advancement Process

For example, as long as the reference start timing Insr is set to be a timing at which the interval IN can be ensured, the reference start timing Insr may be set to the non-synchronous injection start timing Ins without executing the process of S28.

In the above-described embodiments, the process of gradually changing the current non-synchronous injection start timing Ins(n) to the non-synchronous injection start timing Ins determined through the process of S28 on the condition that the non-synchronous injection start timing Ins determined through the process of S28 is more advanced than the last non-synchronous injection start timing Ins(n−1). Instead, for example, when the non-synchronous injection start timing Ins determined through the process of S28 is more advanced than the last non-synchronous injection start timing Ins(n−1) to a small extent, deviation of the air fuel ratio may be small even if the non-synchronous injection start timing Ins determined through the process of S28 is employed. In addition, as described in the section of Required injection amount Qd below, the base injection amount may be corrected by a feed-forward correction amount corresponding to a change in the injection start timing, and the non-synchronous injection start timing Ins determined through the process of S28 may be constantly employed as a final non-synchronous injection start timing Ins.

Required Injection Amount Qd

In the required injection amount Qd, the base injection amount Qb does not have to be corrected by a feedback correction coefficient. For example, the base injection amount Qb may be corrected by a low-temperature increase coefficient corresponding to the water temperature THW. Alternatively, when the charging efficiency η changes greatly, the base injection amount Qb may be further corrected by, for example, a feed-forward correction amount that compensates for a change in the amount of fuel collecting in the intake passage 12 taking into account a large change in the amount of the collected fuel. As another option, the base injection amount Qb may be corrected by, for example, a feed-forward correction amount that limits a change in the amount of fuel supplied into the combustion chamber 24 caused when the amount of fuel collecting in the intake passage 12 changes as the injection start timing changes.

The calculation of the base injection amount Qb based on the valve-closing time inflow air amount Mc predicted in accordance with air models does not necessarily have to be performed. For example, the CPU 52 may perform map calculation for the charging efficiency η in a state in which the ROM 54 already stores map data that includes the rotation speed and the intake air amount Ga as input variables and the charging efficiency η as an output variable and then calculate the base injection amount Qb based on the obtained charging efficiency η. Even in this case, it is desired that the advancement amount of the non-synchronous injection start timing Ins be limited such that the charging efficiency η, which serves as an input for calculating the base injection amount Qb, accurately expresses the amount of fresh air in air-fuel mixture subject to combustion.

Intake Air Synchronous Injection

In the above-described embodiment, in the intake air synchronous injection, the synchronous injection start timing Is is set immediately before the intake valve 18 opens as an example. Instead, the synchronous injection start timing Is may set after the intake valve 18 starts opening and when the intake valve 18 is open.

The intake air synchronous injection may be a process of calculating the synchronous injection start timing Is and then determining the injection end timing with the synchronous injection start timing Is. Instead, for example, the intake air synchronous injection may be a process of calculating the reach end timing, which is the target value of a timing at which fuel injected at the latest timing in the fuel injected from the port injection valve 16 reaches a position during the closing period of the intake valve 18 and then calculating the synchronous injection start timing Is based on the reach end timing, the synchronous injection amount Qs, and the rotation speed NE. Even in this case, it is desired that the intake air synchronous injection be a process of injecting fuel in synchronization with the opening period of the intake valve 18.

More specifically, the intake air synchronous injection is to inject fuel such that a period during which fuel injected from the port injection valve 16 reaches a position before the intake valve 18 opens is within the opening period of the intake valve 18. The starting point of the reach period refers to a timing at which the fuel injected at the earliest timing in the fuel injected from the port injection valve 16 reaches the position before the intake valve 18 opens, and the ending point of the reach period refers to a timing at which the fuel injected at the latest timing in the fuel injected from the port injection valve 16 reaches the position before the intake valve 18 opens. The intake air non-synchronous injection is to inject fuel from the port injection valve 16 such that the fuel injected from the port injection valve 16 reaches the intake valve 18 before the intake valve 18 opens. In other words, in the intake air non-synchronous injection, the fuel injected from the port injection valve 16 remains in the intake passage 12 until the intake valve 18 opens and the fuel flows into the combustion chamber 24 after the intake valve 18 opens. More specifically, it is desired that the intake air non-synchronous injection be to inject fuel from the port injection valve 16 such that a period during which fuel injected from the port injection valve 16 reaches the position before the intake valve 18 opens is within the opening period of the intake valve 18.

Figure 12A:
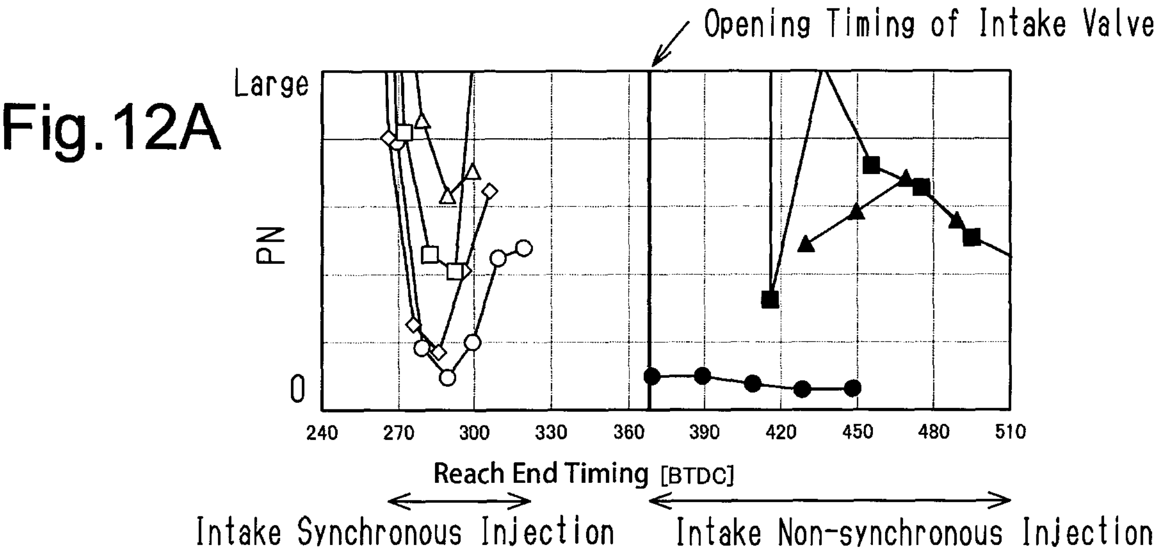
FIG. 12A is a graph illustrating the relationship between the generation amount of PN and a reach end timing of the multiple injection process in the internal combustion engine shown in each figure.
Figure 12B:
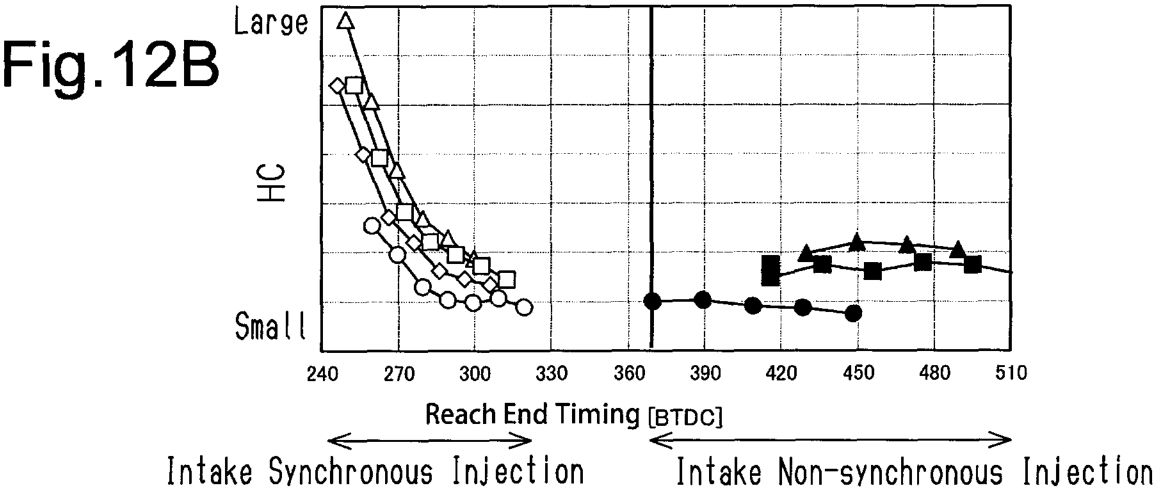
FIG. 12B is a graph illustrating the relationship between the generation amount of HC and the reach end timing of the multiple injection process in the internal combustion engine shown in FIG. 11.

FIG. 12A shows PN when the reach end timings of the intake air non-synchronous injection and the intake air synchronous injection are changed. FIG. 12B shows the generation amount of HC when the reach end timings of the intake air non-synchronous injection and the intake air synchronous injection are changed. In FIGS. 12A and 12B, white plotted points indicate parameters in which the reach end timing of the intake air non-synchronous injection is fixed and the reach end timing of the intake air synchronous injection is changed, and black plotted points indicate parameters in which the reach end timing of the intake air synchronous injection is fixed and the reach end timing of the intake air non-synchronous injection is changed. The circle plotted points, diamond plotted points, square plotted points, and triangle plotted points respectively correspond to 8:2, 7:3, 6:4, and 5:5 in the ratio of the non-synchronous injection amount Qns and the synchronous injection amount Qs.

As shown by the white plotted points in FIGS. 12A and 12B, when the reach end timing of the intake air synchronous injection changes, the generation amounts of PN and HC change greatly.

Single Injection Process

In the above-described embodiment, the single injection process is to end all fuel injections before the intake valve 18 opens. Instead, for example, when the base injection amount Qb is large, the end timing of injection from the port injection valve 16 may be more retarded than the open timing of the intake valve 18. However, as long as the base injection amount Qb is not excessively large, it is desired that fuel injection be performed such that the period in which the fuel injected from the port injection valve 16 reaches the position of the intake valve 18 before opening is within the closing period of the intake valve 18.

Splitting Process of Required Injection Amount Qd

In the above-described embodiment, the rotation speed NE, the charging efficiency the water temperature THW, and the intake phase difference DIN are used to split the required injection amount Qd of fuel into the synchronous injection amount Qs and the non-synchronous injection amount Qns. Instead, for example, the required injection amount Qd may be used instead of the charging efficiency η as a load parameter, which is the parameter that indicates the amount of fresh air filling the combustion chamber 24. In addition, splitting of the required injection amount Qd into the synchronous injection amount Qs and the non-synchronous injection amount Qns may be variably set based on only one, two, or three of four parameters, namely, the load parameter, the rotation speed NE, the water temperature THW, and the intake phase difference DIN. Intake pressure or the flow speed of intake air may be used instead of the four parameters, which can be used to obtain intake pressure or the flow speed of intake air.

Air Model

The air models used to predict the valve-closing time inflow air amount Mc are not limited to the examples illustrated in FIG. 2. For example, the steady-state value correction process M30 and the intake valve model M34 do not have to be incorporated, and the valve-closing time inflow air amount Mc1 outputted by the intake valve model M28 may be used as an input of the injection valve operation process M36.

Characteristic Variable Device for Intake Valve

The characteristic variable device that changes the characteristics of the intake valve 18 is not limited to the intake valve timing adjusting device 44. For example, the characteristic variable device may be a device that changes the lift amount of the intake valve 18. In this case, the parameter that indicates the valve characteristics of the intake valve 18 is, for example, a lift amount instead of the intake phase difference DIN.

Controller

The controller does not have to include the CPU 52 and the ROM 54 to execute software processing. For example, at least part of the processes executed by the software in the above-described embodiment may be executed by hardware circuits dedicated to executing these processes (such as ASIC). That is, the controller may be modified as long as it has any one of the following configurations (a) to (c): (a) A configuration including a processor that executes all of the above-described processes according to programs and a program storage device such as a ROM (including a non-transitory computer readable medium) that stores the programs; (b) A configuration including a processor and a program storage device that execute part of the above-described processes according to the programs and a dedicated hardware circuit that executes the remaining processes; and (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Others

In the above-described embodiments, the advancement limit Ith in the process of S30 is set in accordance with the prediction accuracy of the amount of fresh air filling the combustion chamber 24. Instead, for example, the advancement limit Ith may be set to a timing delayed by the interval IN from the end timing of the intake air synchronous injection prior to one combustion cycle.

The internal combustion engine 10 does not necessarily have to include a characteristic variable device that changes the characteristics of the intake valve 18. The internal combustion engine 10 does not necessarily have to include the throttle valve 14.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the controller being employed for the internal combustion engine, the internal combustion engine comprising a port injection valve that injects fuel into an intake passage, the controller being configured to execute:

a fuel injection process for selecting and executing one of two processes, a multiple injection process and a single injection process, wherein the multiple injection process is to sequentially execute an intake air synchronous injection and an intake air non-synchronous injection by operating the port injection valve in order from the intake air non-synchronous injection to the intake air synchronous injection, the intake air synchronous injection is to inject fuel in synchronization with an opening period of an intake valve, the intake air non-synchronous injection is to inject fuel at a timing that is more advanced than a timing of the intake air synchronous injection, and the single injection process is to execute only the intake air non-synchronous injection by operating the port injection valve, wherein a majority of a fuel injection period of the single injection process is prior to an opening timing of the intake valve; and an advancement process for setting, when switching the fuel injection process from the single injection process to the multiple injection process, an injection start timing of the intake air non-synchronous injection to be more advanced than an injection start timing of the single injection process prior to the switching.

2. The controller according to claim 1, wherein the controller is further configured to execute a synchronization start calculation process for calculating an injection start timing of the intake air synchronous injection in the multiple injection process, and the advancement process includes an ensuring timing calculation process for calculating an interval ensuring timing, wherein the interval ensuring timing is an injection start timing of the intake air non-synchronous injection to end the intake air non-synchronous injection at a timing that is advanced from the injection start timing of the intake air synchronous injection by a predetermined interval, and a determination process for determining the injection start timing of the intake air non-synchronous injection based on an advanced timing of a reference start timing of the intake air non-synchronous injection and the interval ensuring timing.

3. The controller according to claim 2, wherein the advancement process includes a non-synchronous start timing calculation process, and the non-synchronous start timing calculation process is a process for setting the reference start timing to be more advanced when a rotation speed of a crankshaft of the internal combustion engine is high than when the rotation speed is low.

4. The controller according to claim 2, wherein the advancement process includes a process for advancing a current value of the injection start timing of the intake air non-synchronous injection to the interval ensuring timing in a stepwise manner when the interval ensuring timing is more advanced than a last value of the injection start timing of the intake air non-synchronous injection.

5. The controller according to claim 2, wherein the advancement process includes a process for gradually changing the injection start timing of the intake air non-synchronous injection to an injection start timing determined through the determination process when the injection start timing determined through the determination process is more advanced than a last value of the injection start timing of the intake air non-synchronous injection and the interval ensuring timing is not more advanced than the last value of the injection start timing of the intake air non-synchronous injection.

6. The controller according to claim 1, wherein the controller is further configured to execute a required injection amount calculation process for calculating a required injection amount used to control an air-fuel ratio to a target air-fuel ratio based on an amount of fresh air filling a combustion chamber of the internal combustion engine, and the multiple injection process includes a process for splitting the required injection amount into an injection amount of the intake air synchronous injection and an injection amount of the intake air non-synchronous injection.

7. A control method for an internal combustion engine, the control method being employed for the internal combustion engine, the internal combustion engine including a port injection valve that injects fuel into an intake passage, the control method comprising:

selecting and executing one of two processes, a multiple injection process and a single injection process, wherein the multiple injection process is to sequentially execute an intake air synchronous injection and an intake air non-synchronous injection by operating the port injection valve in order from the intake air non-synchronous injection to the intake air synchronous injection, the intake air synchronous injection is to inject fuel in synchronization with an opening period of an intake valve, the intake air non-synchronous injection is to inject fuel at a timing that is more advanced than a timing of the intake air synchronous injection, and the single injection process is to execute only the intake air non-synchronous injection by operating the port injection valve, wherein a majority of a fuel injection period of the single injection process is prior to an opening timing of the intake valve; and setting, when switching a fuel injection process from the single injection process to the multiple injection process, an injection start timing of the intake air non-synchronous injection to be more advanced than an injection start timing of the single injection process prior to the switching.

8. A non-transitory computer-readable storage medium that stores a program causing a processor to execute a control process for controlling an internal combustion engine, the control method being employed for the internal combustion engine, the internal combustion engine including a port injection valve that injects fuel into an intake passage, the control process comprising:

selecting and executing one of two processes, a multiple injection process and a single injection process, wherein the multiple injection process is to sequentially execute an intake air synchronous injection and an intake air non-synchronous injection by operating the port injection valve in order from the intake air non-synchronous injection to the intake air synchronous injection, the intake air synchronous injection is to inject fuel in synchronization with an opening period of an intake valve, the intake air non-synchronous injection is to inject fuel at a timing that is more advanced than a timing of the intake air synchronous injection, and the single injection process is to execute only the intake air non-synchronous injection by operating the port injection valve, wherein a majority of a fuel injection period of the single injection process is prior to an opening timing of the intake valve; and setting, when switching a fuel injection process from the single injection process to the multiple injection process, an injection start timing of the intake air non-synchronous injection to be more advanced than an injection start timing of the single injection process prior to the switching.

* * * * *